(12) United States Patent
Zhou et al.

(10) Patent No.: US 11,661,885 B2
(45) Date of Patent: May 30, 2023

(54) AIR-ASSISTED JET FLAME IGNITION DEVICE AND IGNITION METHOD THEREOF

(71) Applicant: TIANJIN UNIVERSITY, Tianjin (CN)

(72) Inventors: Lei Zhou, Tianjin (CN); Qiang Gao, Tianjin (CN); Jianxiong Hua, Tianjin (CN); Zongkuan Liu, Tianjin (CN); Haiqiao Wei, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 17/793,290

(22) PCT Filed: Mar. 12, 2021

(86) PCT No.: PCT/CN2021/080385
§ 371 (c)(1),
(2) Date: Jul. 15, 2022

(87) PCT Pub. No.: WO2022/141804
PCT Pub. Date: Jul. 7, 2022

(65) Prior Publication Data
US 2023/0040984 A1    Feb. 9, 2023

(30) Foreign Application Priority Data
Dec. 31, 2020    (CN) .......................... 202011621596.9

(51) Int. Cl.
*F02B 19/10* (2006.01)
*F02B 19/08* (2006.01)
(Continued)

(52) U.S. Cl.
CPC .......... *F02B 19/1028* (2013.01); *F02B 19/08* (2013.01); *F02B 19/10* (2013.01);
(Continued)

(58) Field of Classification Search
None
See application file for complete search history.

(56) References Cited

U.S. PATENT DOCUMENTS 3,113,561 A * 12/1963 Heintz ................ F02B 19/1052
123/262
5,085,189 A    2/1992 Huang et al.
(Continued)

FOREIGN PATENT DOCUMENTS

AU    2014290486 A1 *    2/2016    ................ C10J 3/20
CN    105371301 A    3/2016
(Continued)

OTHER PUBLICATIONS

PCT International Search Report and PCT Written Opinion of the International Searching Authority; Application No. PCT/CN2021/080385; dated Sep. 29, 2021; 11 pages.
(Continued)

*Primary Examiner* — Kevin R Steckbauer
(74) *Attorney, Agent, or Firm* — Conley Rose, P.C.; Grant Rodolph

(57) ABSTRACT

An air-assisted jet flame ignition device includes a housing, a fuel-air premixing unit, and a prechamber. The fuel-air premixing unit includes a fuel injector, an air injection valve, a premixing sleeve, a premixing sleeve inner core placed in the premixing sleeve, and a fuel injector fastening bolt. An inner wall surface of the premixing sleeve and an outer wall surface of the premixing sleeve inner core form a premixing sleeve inner cavity. An inner wall surface of the premixing sleeve inner core, a lower end surface of a nozzle of the fuel injector, and an upper end surface of an air inlet of the air injection valve form a premixing cavity. The premixing cavity coupled to the premixing sleeve inner cavity via a through hole on the sidewall of the premixing sleeve inner (Continued)

core. A prechamber nozzle is fixedly coupled to the lower part of the housing.

20 Claims, 4 Drawing Sheets

(51) Int. Cl.
  *F02B 19/12* (2006.01)
  *F02P 21/00* (2006.01)
(52) U.S. Cl.
  CPC ...... *F02B 19/1023* (2013.01); *F02B 19/1071* (2013.01); *F02B 19/12* (2013.01); *F02P 21/00* (2013.01)

(56) References Cited

U.S. PATENT DOCUMENTS

| | | | | |
|---|---|---|---|---|
| 10,161,296 | B2 * | 12/2018 | Schock | F02B 19/1023 |
| 2016/0230645 | A1 * | 8/2016 | Schock | F02B 19/1052 |
| 2023/0040984 | A1 * | 2/2023 | Zhou | F02P 21/00 |

FOREIGN PATENT DOCUMENTS

| | | | | |
|---|---|---|---|---|
| CN | 106014694 A | | 10/2016 | |
| CN | 106014694 A | * | 10/2016 | |
| CN | 107429602 A | * | 12/2017 | F02B 19/10 |
| CN | 108331658 A | * | 7/2018 | F02B 19/12 |
| CN | 108332199 A | | 7/2018 | |
| CN | 108350833 A | * | 7/2018 | F02B 19/1023 |
| CN | 106014694 B | * | 8/2018 | |
| CN | 109989822 A | | 7/2019 | |
| CN | 107429602 B | * | 12/2019 | F02B 19/10 |
| CN | 110725765 A | * | 1/2020 | F02B 19/108 |
| CN | 211144677 U | * | 7/2020 | F02B 19/108 |
| CN | 108350833 B | * | 9/2020 | F02B 19/1023 |
| CN | 112145281 A | | 12/2020 | |
| CN | 112796870 A | * | 5/2021 | F02B 19/1066 |
| CN | 112814778 A | * | 5/2021 | F02B 19/10 |
| CN | 112879145 A | * | 6/2021 | F02B 19/1009 |
| CN | 113153515 A | | 7/2021 | |
| CN | 113882938 A | * | 1/2022 | |
| CN | 112879145 B | * | 4/2022 | F02B 19/1009 |
| CN | 115234358 A | | 10/2022 | |
| CN | 115234368 A | | 10/2022 | |
| CN | 112814778 B | * | 2/2023 | F02B 19/10 |
| DE | 102019111091 B3 | * | 7/2020 | |
| DE | 102021104182 A1 | | 8/2021 | F02B 19/1061 |
| WO | WO-2022141804 A1 | * | 7/2022 | F02B 19/10 |

OTHER PUBLICATIONS

Chinese Office Action; Application No. 202011621596.9; dated Jan. 28, 2022; 5 pages.

* cited by examiner ized on the basis of an original prechamber structure, and the engine can stably work in the working condition of high EGR rate through high ignition energy of jet flame.

AIR-ASSISTED JET FLAME IGNITION DEVICE AND IGNITION METHOD THEREOF

CROSS-REFERENCE TO RELATED APPLICATIONS

This is a U.S. National Stage of International Patent Application No. PCT/CN2021/080385 filed on Mar. 12, 2021, which claims priority to Chinese Patent Application No. 202011621596.9 filed on Dec. 31, 2020. Both of the aforementioned disclosures are hereby incorporated by reference in their entireties.

TECHNICAL FIELD

This disclosure belongs to the field of combustion of internal combustion engines, and in particular, to an air-assisted jet flame ignition device suitable for an engine with a high exhaust gas recirculation (EGR) rate.

BACKGROUND

The growing concern for environment and energy issues, and the increasing stringency of related laws and regulations are driving the internal combustion engine industry to develop in the direction of higher efficiency and lower emissions. EGR technology, which was first used as an effective means for reducing nitrogen oxides (NOx) in diesel engines, has now been widely used in all types of automotive engines. EGR technology can effectively reduce the temperature of mixture in the cylinder by introducing exhaust gas into an intake manifold to dilute the mixture in the cylinder, thus reducing NOx emissions. The experimental results show that the use of 10 percent (%) EGR rate can reduce NOx emissions by 50-70%. At the same time, the application of EGR technology can also reduce pumping loss under partial load of gasoline engines, which is conducive to improving engine thermal efficiency.

Moreover, EGR technology is also effective in mitigating engine knocking. The current mainstream view on engine knocking is that end mixture in the cylinder is compressed by the flame front, and the temperature and pressure continue to rise to cause end-gas auto-ignition, thus creating a reciprocal oscillating pressure wave in the cylinder. EGR technology can reduce the temperature and pressure of the end mixture to avoid end-gas auto-ignition, especially for supercharged high load conditions.

However, there are some problems in the application of EGR technology. For example, the over-high EGR rate leads to unstable combustion in the in-cylinder, and the flame propagation speed is decreased, resulting in the increase in the combustion duration. The previous experimental data show that an engine with jet ignition can work stably in lean burn conditions with the excess air coefficient above 2.0. In addition, the flame jets injected by jet ignition system not only can stably ignite the lean mixture, but also can accelerate the combustion rate of the mixture. The same effect is achieved for engine combustion in the working condition of a high EGR rate.

In the lean burn condition, the excess air exists in the engine cylinder, thus additional fuel injection is required in the prechamber to maintain an equivalent or rich mixture. But in the working condition of high EGR rate, the original excess air is replaced with exhaust gas. Thus, both fuel injection and air injection are required in the prechamber to achieve reliable internal ignition. Based on such an idea, a fuel-air premixing unit is introduced on the basis of an original prechamber structure, and the engine can stably work in the working condition of high EGR rate through high ignition energy of jet flame.

SUMMARY

An objective of the present disclosure is to provide an air-assisted jet flame ignition device capable of realizing reliable ignition of an engine in a high EGR rate condition. In accordance with this disclosure, a fuel-air premixing unit is introduced on the basis of an original prechamber structure to create a good ignition condition in a prechamber, and then a spark plug in a prechamber cavity body is used to ignite a prechamber charge to inject flame jets into a main combustion chamber, thus achieving stable combustion of the main combustion chamber in the condition of high EGR rate. The technical solution is as follows.

An air-assisted jet flow ignition device comprises a housing, a fuel-air premixing unit, and a prechamber, wherein the fuel-air premixing unit comprises a fuel injector, an air injection valve, a premixing sleeve, a premixing sleeve inner core placed in the premixing sleeve, and a fuel injector fastening bolt.

An inner wall surface of the premixing sleeve and an outer wall surface of the premixing sleeve inner core form a premixing sleeve inner cavity, an inner wall surface of the premixing sleeve inner core, a lower end surface of a nozzle of the fuel injector and an upper end surface of an air inlet of the air injection valve form a premixing cavity.

The premixing cavity communicates with the premixing sleeve inner cavity via a through hole on the sidewall of the premixing sleeve inner core.

A prechamber nozzle is fixedly connected to a lower part of the housing by a locating pin, the circumference of the lower part of the housing is provided with external threads, the periphery of the prechamber nozzle is provided with external threads, and internal threads in fit with the external threads of the housing are formed in a nozzle compression piece. The nozzle compression piece presses the prechamber nozzle against the housing to form a precombustion cavity body.

Further, the high-pressure air enters through an air tube, then enters the premixing sleeve inner cavity, and is afterwards injected into the premixing cavity via the through hole on the sidewall of the premixing sleeve inner core to be mixed with a fuel. A premixed fuel-air mixture is ultimately injected into the prechamber cavity body by the air injection valve.

An ignition method for realizing the ignition device comprises the following steps of defining turn-on time of the fuel injector as fuel injection pulse width, defining turn-on time of the air injection valve as an air injection pulse width, turning on the fuel injector according to the fuel injection pulse width to inject the fuel, and determining delay time according to the fuel injection amount, wherein such delay time is called air injection delay, and then turning on the air injection valve according to the air injection pulse width after reaching the specified air injection delay, wherein the premixed fuel-air mixture is ultimately injected into the prechamber cavity body by the air injection valve and then is ignited by a spark plug to inject flame jets.

Further, an excess air coefficient of the prechamber mixture is determined by regulating the fuel injection pulse width and the air injection pulse width, with the principle as follows: increasing the fuel injection pulse width if a rich mixture is needed, and increasing the air injection pulse width if a lean mixture is needed.

Further, an equivalent mixture or a rich mixture with an excessive air coefficient less than 1 is employed to guarantee stable ignition in the prechamber.

Compared with other approaches, the technical solution of the present disclosure brings the beneficial effects as follows.

In the condition of high EGR rate, spark ignition cannot stably ignite the mixture. Although the ignition energy of an ordinary jet ignition device is high, in the condition of high EGR rate, a large amount of exhaust gas may exist inside the ignition device, resulting in unstable ignition. In accordance with the present disclosure, the stable ignition inside the prechamber can be achieved by injecting the premixed air-fuel mixture into the prechamber in an air-assisting mode, and then the fuel mixture in the main combustion chamber can be ignited by using high ignition energy of the jet flame.

The fuel-air premixing unit of the device of the present disclosure employs a structure of a stacked fuel injector and air injection valve, which can effectively reduce a diameter of the device and facilitate installation on the engine. Moreover, the process of injecting the mixture into the prechamber cavity body is equivalent to the secondary mixing of the fuel and air. Therefore, the mixing effect of the fuel with high viscosity and poor atomization effect can be improved, such as aviation kerosene.

The fuel-air premixing unit of the device of the present disclosure injects the air from the sidewall of the premixing sleeve, thus effectively reducing a fuel wall-wetting phenomenon.

Figure 1:
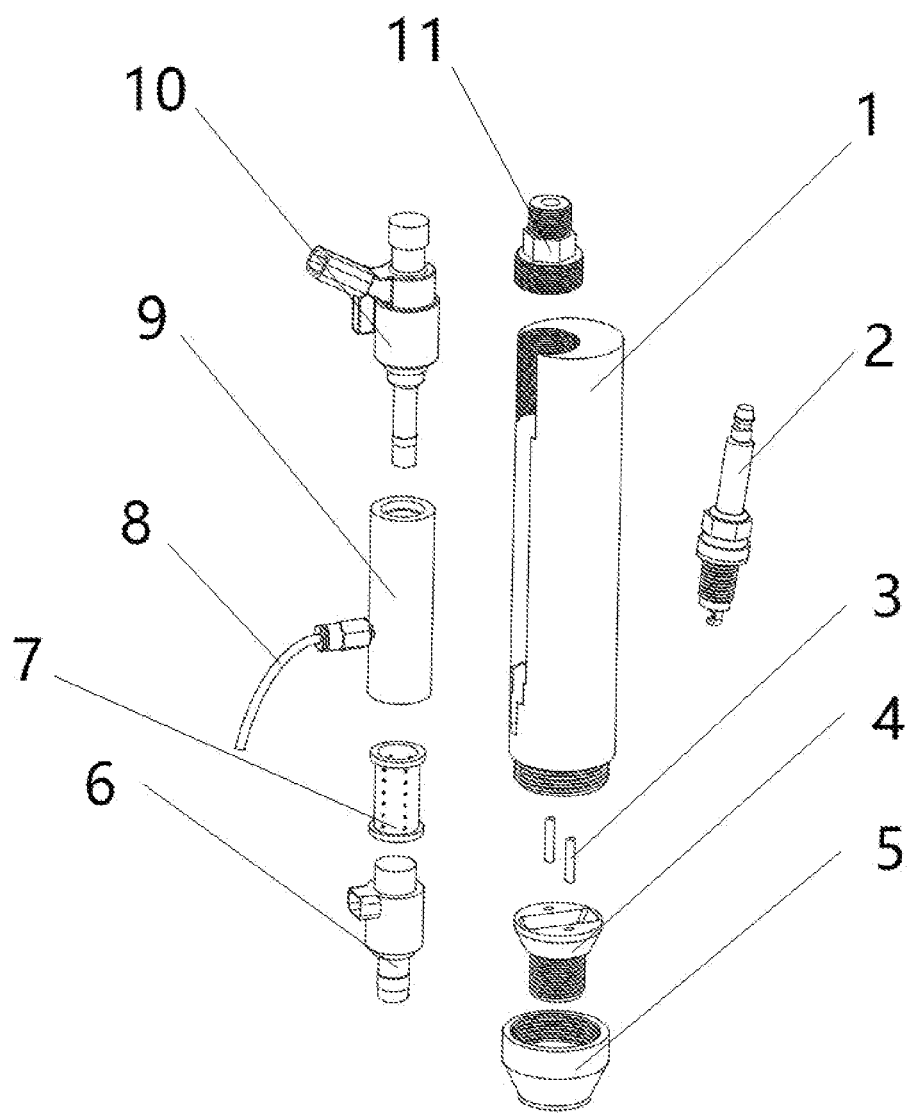
FIG. 1 is an exploded view of parts of a device in accordance with the present disclosure.
Figure 2:
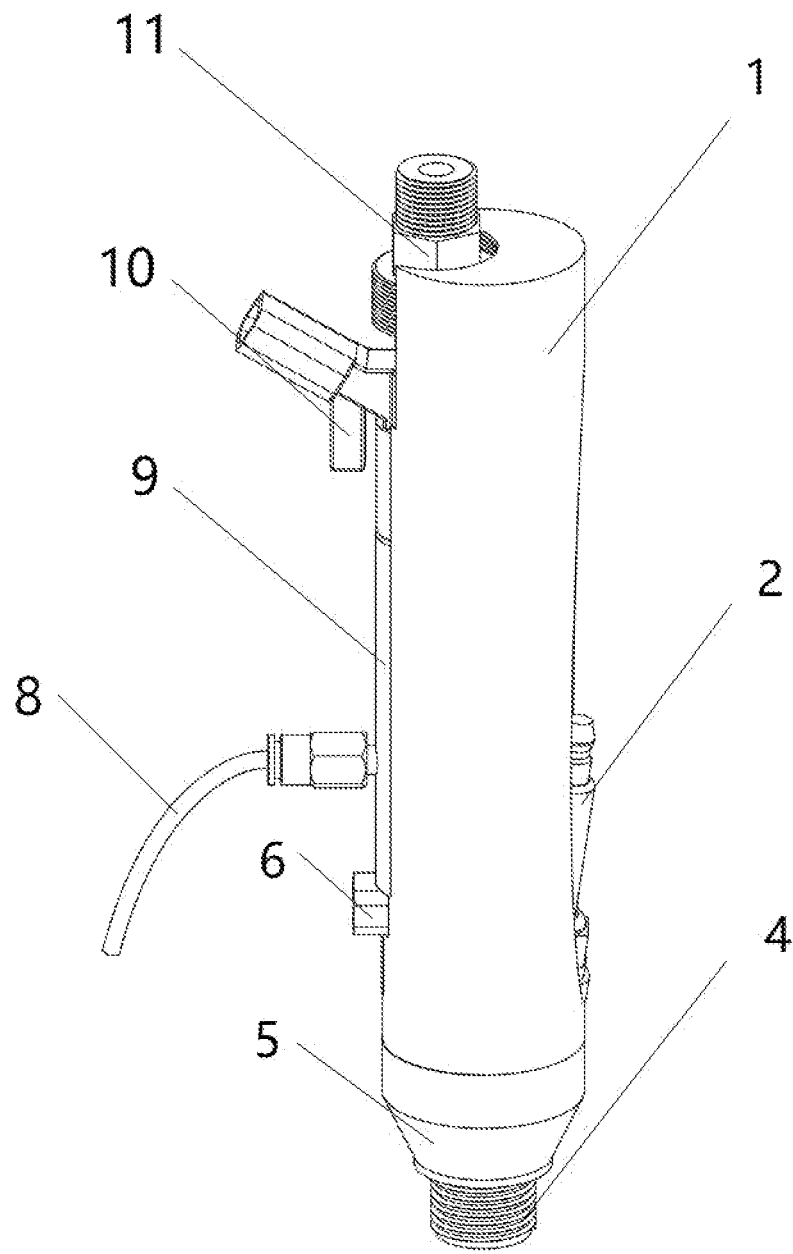
FIG. 2 is a schematic diagram of the assembly of a device in accordance with the present disclosure.
Figure 3:
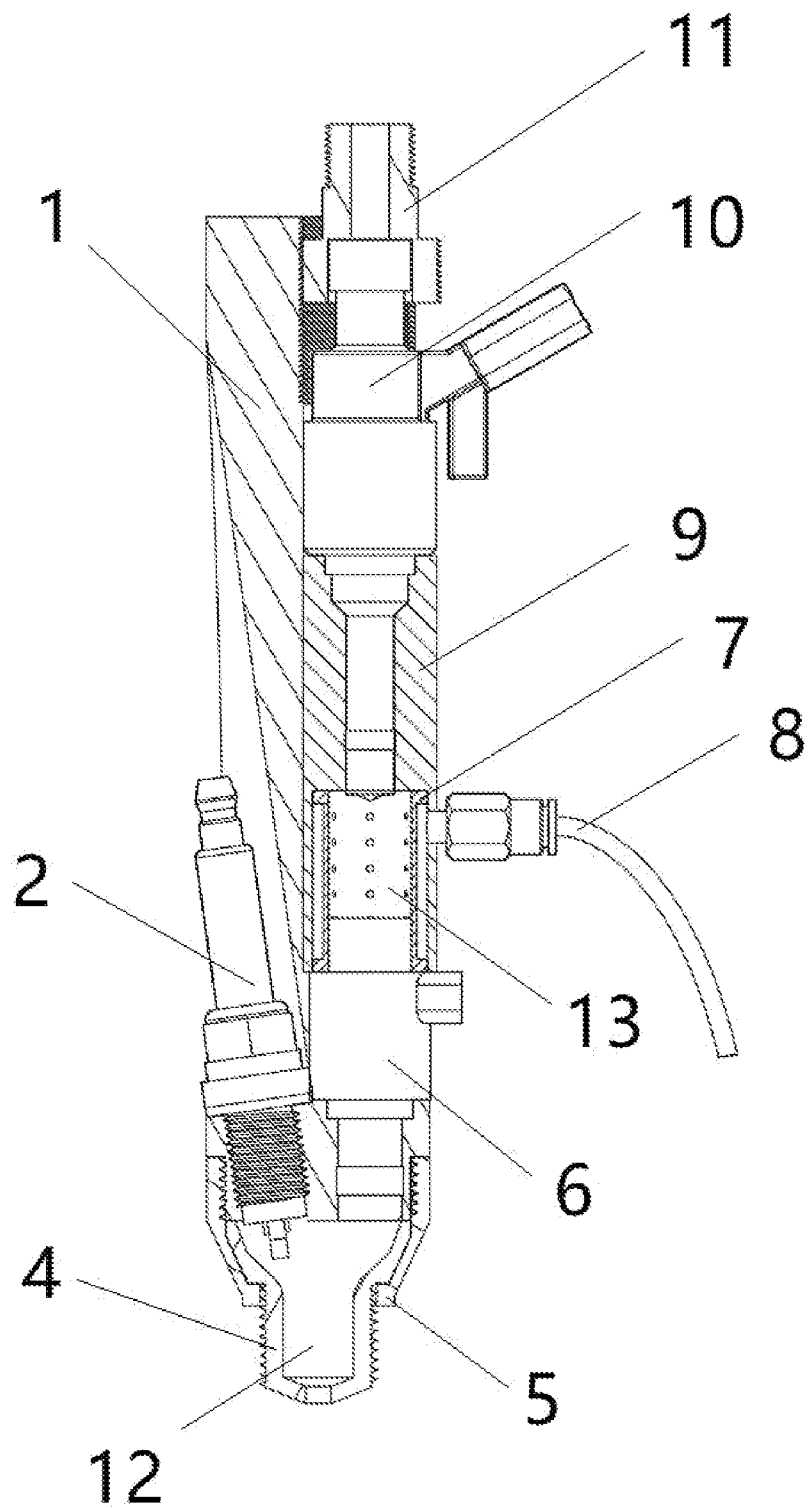
FIG. 3 is a sectional view of a device in accordance with the present disclosure.

Reference numerals: 1—housing; 2—spark plug; 3—locating pin; 4—prechamber nozzle; 5—nozzle compression piece; 6—air injection valve; 7—premixing sleeve inner core; 8—air tube; 9—premixing sleeve; 10—fuel injector; 11—fuel injector fastening bolt; 12—prechamber cavity body; 13—premixing cavity; and 14—premixing sleeve inner cavity.

DETAILED DESCRIPTION OF THE EMBODIMENTS

FIG. 1 is an exploded view of parts of a device in accordance with the present disclosure. The device comprises a total of ten parts, which are divided into three portions according to their functions: a housing, a fuel-air premixing unit, and a prechamber. The function of housing 1 is to provide installation positions for other parts. The function of the fuel-air premixing unit is to provide a premixed mixture of fuel and air for the prechamber. The fuel-air premixing unit comprises a fuel injector 10, an air injection valve 6, a premixing sleeve inner core 7, a premixing sleeve 9, and a fuel injector fastening bolt 11. The function of the prechamber is to provide flame jets for a main combustion chamber. The prechamber comprises a spark plug 2, a prechamber nozzle 4, a locating pin 3, and a nozzle compression piece 5.

During installation, the air injection valve 6, the premixing sleeve inner core 7, the premixing sleeve 9, and the fuel injector 10 are sequentially placed in and are jointly pressed against the housing 1 by the fuel injector fastening bolt 11 at the top. Next, the spark plug 2 is installed, and the end, the locating pin 3, the prechamber nozzle 4, and the nozzle compression piece 5 are sequentially installed, wherein the locating pin 3 is provided for preventing the prechamber nozzle 4 from rotating. The device is entirely installed on a cylinder head by the threads on the prechamber nozzle 4.

Figure 4:
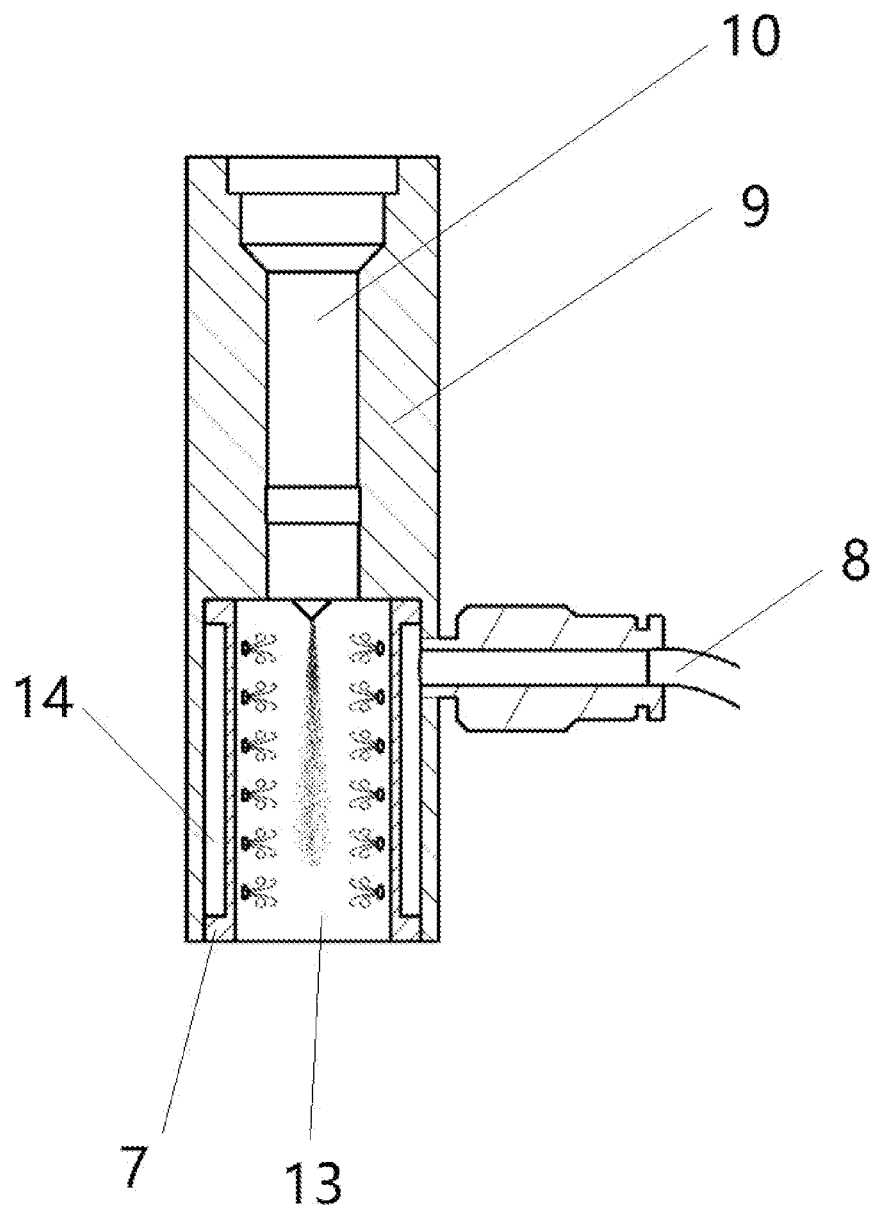
FIG. 4 is a schematic diagram of fuel-air premixing of a fuel premixing device of a device in accordance with the present disclosure.

The fuel-air premixing unit is discussed further. The fuel-air premixing unit plays a role in providing a premixed air-fuel mixture for the prechamber. As shown in FIG. 4, the fuel is injected into the premixing cavity 13 by the fuel injector 10. The air flows in through an air tube 8, the air first enters the premixing sleeve inner cavity 14, then is injected into the premixing cavity 13 through orifices on the premixing sleeve inner core 7 to be mixed with the fuel, and then the mixture is injected into the prechamber cavity body 12 by the air injection valve 6. The injected premixed mixture has a scavenging function and can scavenge the residual exhaust gas in the prechamber cavity body 12.

Determination of use parameters is as follows. A fuel injection pressure can be selected to be 10-20 megapascals (MPa) according to different selected fuels. The pressure of the air tube 8 is the same as that of the premixing cavity, and as the premixed mixture is to be injected into the prechamber cavity body 12 from the premixing cavity 13, the pressure of the premixing cavity 13 is higher than that of the prechamber cavity body 12, generally ranging from 0.4 MPa to 1 MPa.

The specific working process is as follows. Turning on the fuel injector according to a fuel injection pulse width to inject the fuel, wherein the fuel is mixed with the air within an air injection delay time. Then turning on the air injection valve according to an air injection pulse width, wherein the mixture is injected into the prechamber cavity body and is ignited by the spark plug to inject flame jets.

An excess air coefficient of the prechamber mixture can be determined by regulating the fuel injection pulse width and the air injection pulse width, which is shown as follows. Increasing the fuel injection pulse width if a rich mixture is needed, and increasing the air injection pulse width if a lean mixture is needed. The air can be continuously injected after the premixed mixture is completely injected into the prechamber cavity body to increase the air injection pulse width, thus diluting the mixture in the prechamber. However, in order to guarantee stable ignition in the prechamber, an equivalent mixture or a rich mixture with an excess air coefficient less than 1 is generally employed.

The present disclosure is not limited to the embodiments described above. The above description of specific embodiments is intended to describe and illustrate technical solutions of the present disclosure, and the above specific embodiments are merely illustrative rather than restrictive. Those of ordinary skill in the art, under the inspiration of the present disclosure, may make many specific changes in form without departing from the spirit of the present disclosure and the scope of the protection of the claims, all of which fall within the scope of protection of the present disclosure.

What is claimed is:

1. An air-assisted jet flame ignition device, comprising:
   a housing comprising a lower part, wherein a circumference of the lower part comprises first external threads;
   a fuel-air premixing unit comprising:

a fuel injector, comprising a nozzle, wherein the nozzle comprises a lower end surface;
an air injection valve comprising an air inlet, wherein the air inlet comprises an upper end surface;
a premixing sleeve comprising a first inner wall surface;
a premixing sleeve inner core placed in the premixing sleeve and comprising:
 a sidewall;
 a through hole located on the sidewall;
 a second inner wall surface, wherein the second inner wall surface, the lower end surface, and the upper end surface are configured to form a premixing cavity; and
 an outer wall surface, wherein the first inner wall surface and the outer wall surface are configured to form a premixing sleeve inner cavity, and wherein the premixing cavity is coupled to the premixing sleeve inner cavity via the through hole; and
a fuel injector fastening bolt,
a prechamber comprising:
 a locating pin;
 a prechamber nozzle fixedly coupled to the lower part using the locating pin, wherein a periphery of the prechamber nozzle comprises second external threads; and
 a nozzle compression piece, wherein internal threads in fit with the first external threads are located inside the nozzle compression piece, and wherein the nozzle compression piece is configured to press the prechamber nozzle against the housing to form a prechamber cavity body.

2. The air-assisted jet flame ignition device of claim 1, further comprising an air tube coupled to the premixing sleeve, wherein a high-pressure air is configured to enter, through the air tube, to the premixing sleeve inner cavity and is further injected into the premixing cavity via the through hole to be mixed with fuel to obtain a premixed fuel-air mixture, and wherein the air injection valve is configured to inject and the premixed fuel-air mixture into the prechamber cavity body.

3. The air-assisted jet flame ignition device of claim 2, wherein the premixed fuel-air mixture has a scavenging capability and scavenges residual exhaust gas in the prechamber cavity body.

4. The air-assisted jet flame ignition device of claim 1, wherein the air injection valve, the premixing sleeve inner core, the premixing sleeve, and the fuel injector are sequentially placed in and are jointly pressed against the housing by the fuel injector fastening bolt at a top.

5. An ignition method comprising:
defining a first turn-on time of a fuel injector of an ignition device as a fuel injection pulse width;
defining a second turn-on time of an air injection valve of the ignition device as an air injection pulse width;
turning on the fuel injector according to the fuel injection pulse width to inject fuel;
determining a delay time according to a fuel injection amount, wherein the delay time is called an air injection delay;
turning on, according to the air injection pulse width, the air injection valve after reaching the air injection delay to inject air to obtain a premixed fuel-air mixture;
injecting, by the air injection valve, the premixed fuel-air mixture into a prechamber cavity body of the ignition device; and
igniting, by a spark plug of the ignition device, the premixed fuel-air mixture to inject flame jets.

6. The ignition method of claim 5, further comprising determining an excess air coefficient of a prechamber mixture by regulating the fuel injection pulse width and the air injection pulse width.

7. The ignition method of claim 5, further comprising injecting an equivalent mixture with an excessive air coefficient less than 1 into the prechamber cavity body.

8. The ignition method of claim 6, further comprising injecting an equivalent mixture with an excessive air coefficient less than 1 into the prechamber cavity body.

9. The ignition method of claim 6, further comprising injecting a rich mixture with an excessive air coefficient less than 1 into the prechamber cavity body.

10. The ignition method of claim 5, further comprising:
identifying that a rich mixture is needed in the prechamber cavity body; and
increasing, in response to the identifying, the fuel injection pulse width to obtain the rich mixture.

11. The ignition method of claim 5, further comprising:
identifying that a lean mixture is needed in the prechamber cavity body; and
increasing, in response to the identifying, the air injection pulse width.

12. The ignition method of claim 5, further comprising injecting a rich mixture with an excessive air coefficient less than 1 into the prechamber cavity body.

13. The ignition method of claim 5, wherein a fuel injection pressure is 10 megapascals to 20 MPa.

14. The ignition method of claim 5, wherein an air injection pressure is 0.4 megapascals to 1 MPa.

15. A fuel-air premixing component comprising:
a fuel injector comprising a nozzle, wherein the nozzle comprises a lower end surface;
an air injection valve comprising an air inlet, wherein the air inlet comprises an upper end surface;
a premixing sleeve comprising a first inner wall surface;
a premixing sleeve inner core placed in the premixing sleeve and comprising:
 a sidewall;
 a through hole located on the sidewall;
 a second inner wall surface, wherein the second inner wall surface, the lower end surface, and the upper end surface are configured to form a premixing cavity, and wherein the premixing cavity coupled to the premixing sleeve inner cavity via the through hole; and
 an outer wall surface, wherein the first inner wall surface and the outer wall surface are configured to form a premixing sleeve inner cavity; and
a fuel injector fastening bolt.

16. The fuel-air premixing component of claim 15, further comprising an air tube coupled to the premixing sleeve, wherein a high-pressure air is configured to enter, through the air tube, to the premixing sleeve inner cavity and further injected into the premixing cavity via the through hole to be mixed with fuel to obtain a premixed fuel-air mixture, and wherein the air injection valve is configured to inject the premixed fuel-air mixture into a prechamber cavity body.

17. The fuel-air premixing component of claim 16, wherein the premixed fuel-air mixture has a scavenging capability and scavenges residual exhaust gas in the prechamber cavity body.

18. The fuel-air premixing component of claim 16, wherein a fuel injection pressure is 10 megapascals to 20 MPa.

19. The fuel-air premixing component of claim 16, wherein an air injection pressure is 0.4 megapascals to 1 MPa.

20. The fuel-air premixing component of claim 15, wherein the air injection valve, the premixing sleeve inner core, the premixing sleeve, and the fuel injector are sequentially placed in and are jointly pressed against a housing by the fuel injector fastening bolt at a top.

\* \* \* \* \*